United States Patent [19]

Cavanaugh

[11] Patent Number: 4,738,592
[45] Date of Patent: Apr. 19, 1988

[54] CAM ASSISTED BLADE FOLDING SYSTEM
[75] Inventor: Thomas J. Cavanaugh, Upper Darby, Pa.
[73] Assignee: The Boeing Company, Seattle, Wash.
[21] Appl. No.: 656,063
[22] Filed: Sep. 28, 1984
[51] Int. Cl.[4] .......................................... B64C 27/35
[52] U.S. Cl. .................................. 416/140; 416/142; 416/143
[58] Field of Search ............... 416/140 A, 140 R, 142, 416/143

[56] References Cited

U.S. PATENT DOCUMENTS

| | | | |
|---|---|---|---|
| 2,134,660 | 10/1938 | Everts | 416/143 |
| 2,365,357 | 12/1944 | Prewitt | 416/143 |
| 2,950,767 | 8/1960 | Lemont, Jr. | 416/143 |
| 3,158,203 | 11/1964 | Grunfelder | 416/143 |
| 3,187,818 | 6/1965 | Barrett et al. | 416/143 X |
| 3,282,350 | 11/1966 | Kisovec | 416/143 |
| 3,356,155 | 12/1967 | Ferris | 416/143 |
| 3,438,446 | 4/1969 | Vacca et al. | 416/143 |
| 3,438,447 | 4/1969 | Ferris | 416/143 |
| 3,484,175 | 12/1969 | Vacca et al. | 416/143 |
| 3,647,315 | 3/1972 | Rostad et al. | 417/143 X |
| 3,749,515 | 7/1973 | Covington et al. | 416/143 |
| 4,516,909 | 5/1985 | Caramaschi et al. | 416/140 X |

FOREIGN PATENT DOCUMENTS 631092  11/1961  Canada ............................ 416/143

Primary Examiner—Carlton R. Croyle
Assistant Examiner—Ted Olds
Attorney, Agent, or Firm—Jones, Tullar & Cooper

[57] ABSTRACT

A system for folding a helicopter rotor blade in which the lead-lag damper is mounted to the rotor blade spar, attached to the pitch housing and centered at the vertical pin flap hinge axis. This design of the lead-lag damper corresponding to a specially designed cam has a single actuator used to fold the rotor blade by sequentially engaging the cam with the actuator and lead-lag damper. Connected to the lead-lag damper is a lead-lag damper linkage assembly which is located in the operative position of the rotor blade so that flight loads are transferred directly to the pitch housing thereby uncoupling the actuator and cam from the path of these loads. In addition, this linkage is connected over center during blade folding so that the rotor blade cannot be back driven.

10 Claims, 3 Drawing Sheets

CAM ASSISTED BLADE FOLDING SYSTEM

TECHNICAL FIELD

The present invention relates to a system for folding helicopter rotor blades.

BACKGROUND OF THE INVENTION

The need to fold and unfold the rotor blades of a helicopter with respect to the helicopter fuselage and a system for doing so are well established as evidenced by U.S. Pat. Nos. 3,153,455; 3,187,818; 3,247,907 and 3,369,610.

New generations of helicopters with their innovations rotor head designs resulting in higher speeds and greater rotor head loads require ever more compact blade folding systems. The present invention represents such a system. For example, it may replace the system disclosed in U.S. patent application Ser. No. 429,365, now U.S. Pat. No. 4,543,040, assigned to the assignee of the present invention. The system which may be replaced is shown in FIG. 1. In its essential parts the lag damper and blade folding mechanism 10 includes an elastomeric lag damper 12, a fold motor and gear box 14 and associated linkages including a bellcrank 16 fastened at the lead-lag hinge 18 to the rotor blade 20. The fold motor and gear box 14 has a rod 22 extending therefrom which engages a bellcrank 24 which in turn is connected to the bellcrank 16 by a connecting rod 26.

One difficulty observed with blade folding mechanism 10 is that the linkage experiences flight loads during rotor head operation. This results in the need to oversize the various components of the system to support the flight loads.

Therefore, it would be desirable to have a system in which the blade fold linkage is not in the flight load path.

SUMMARY OF THE INVENTION

The present invention is a blade folding system that provides a direct path to ground for flight loads.

The present invention is unique in its utilization of a specially designed lead-lag damper.

The present invention is also unique in its provision of a single actuator which provides a sequential output to pitch lock and blade fold linkages.

The present invention is also unique in that it provides short, compact crank arms, with cam assist to produce large blade fold angles.

The present invention is also unique in that it provides an overcenter reaction design which cannot be backdriven.

Included in the system is a semi-circular elastomeric lag damper which wraps around the inboard ends of the blade spar. A roller is mounted on the damper to assist in the fold operation. (This damper can also be used without the fold system.)

In the system of the present invention, blade fold linkage need be sized only for the blade folding loads.

BRIEF DESCRIPTION OF THE DRAWING

Three figures have been selected to illustrate a preferred embodiment of the invention. The figures are schematic in nature. They are, however, sufficiently detailed to enable the person skilled in the art to understand and practice the invention.

Illustrated are.

DETAILED DESCRIPTION

Figure 1:
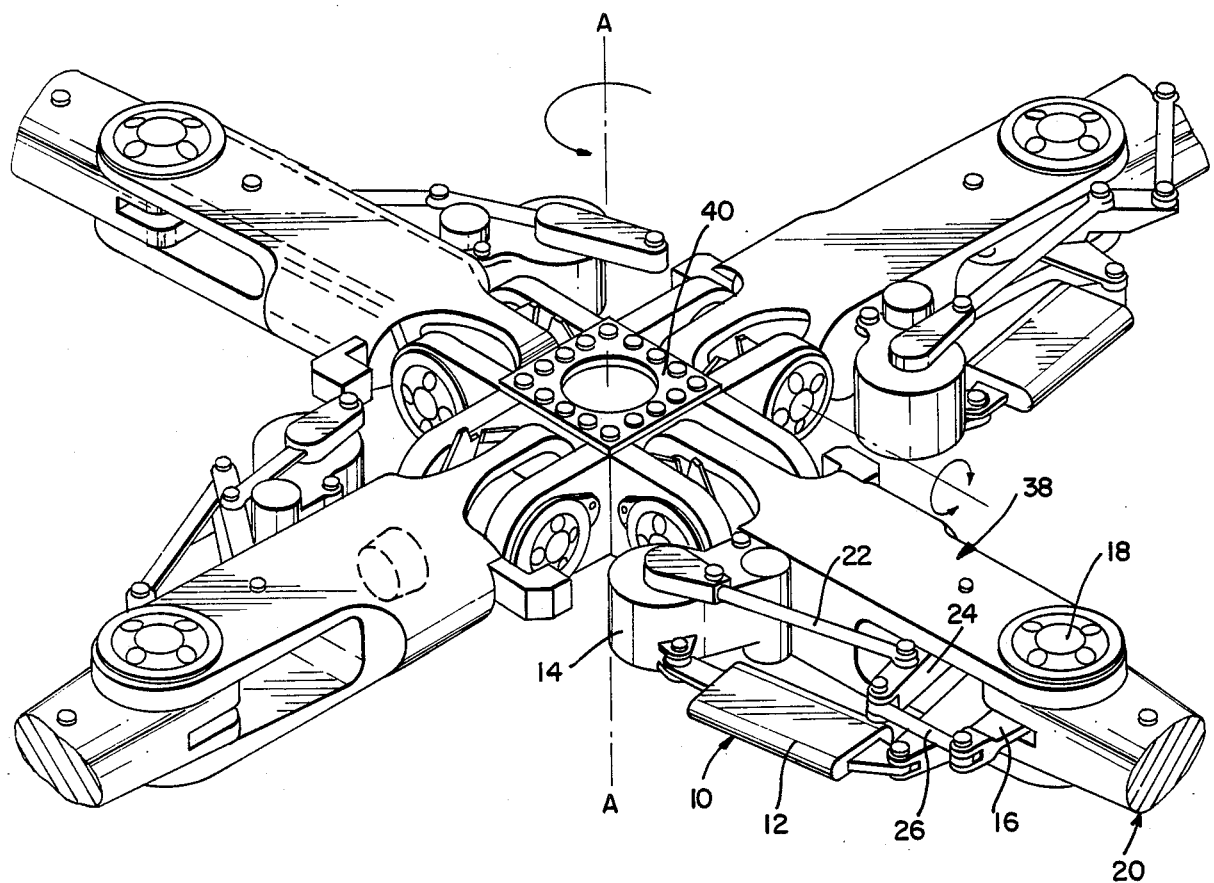
FIG. 1, which is schematic perspective view of a four-bladed rotor system on which the blade folding system may be replaced by the present invention.

As noted previously, the reason that the blade folding mechanism 10 (FIG. 1) experiences flight loads during rotor head operation is that the lead-lag damper 12 is connected directly to the fold motor and gear box (actuator) 14. A load path is thus established through the fold motor and gear box 14 to the pitch housing.

In the present invention, flight loads are transmitted from the rotor blade, through the lag damper, through the drag link and drag lever, directly to the pitch housing.

The blade folding system 28 includes in its essential parts a lead-lag damper 30, a lead-lag damper linkage assembly 32 including a drag link 54, a drag lever 62 and a blade fold link 68, a cam 34 and an actuator 36. The actuator 36, the cam 34 and the drag lever 62 are mounted to a pitch housing 38, similar to that shown in FIG. 1, which in turn is mounted to a rotor hub 40, also similar to that shown in FIG. 1.

Figure 2:
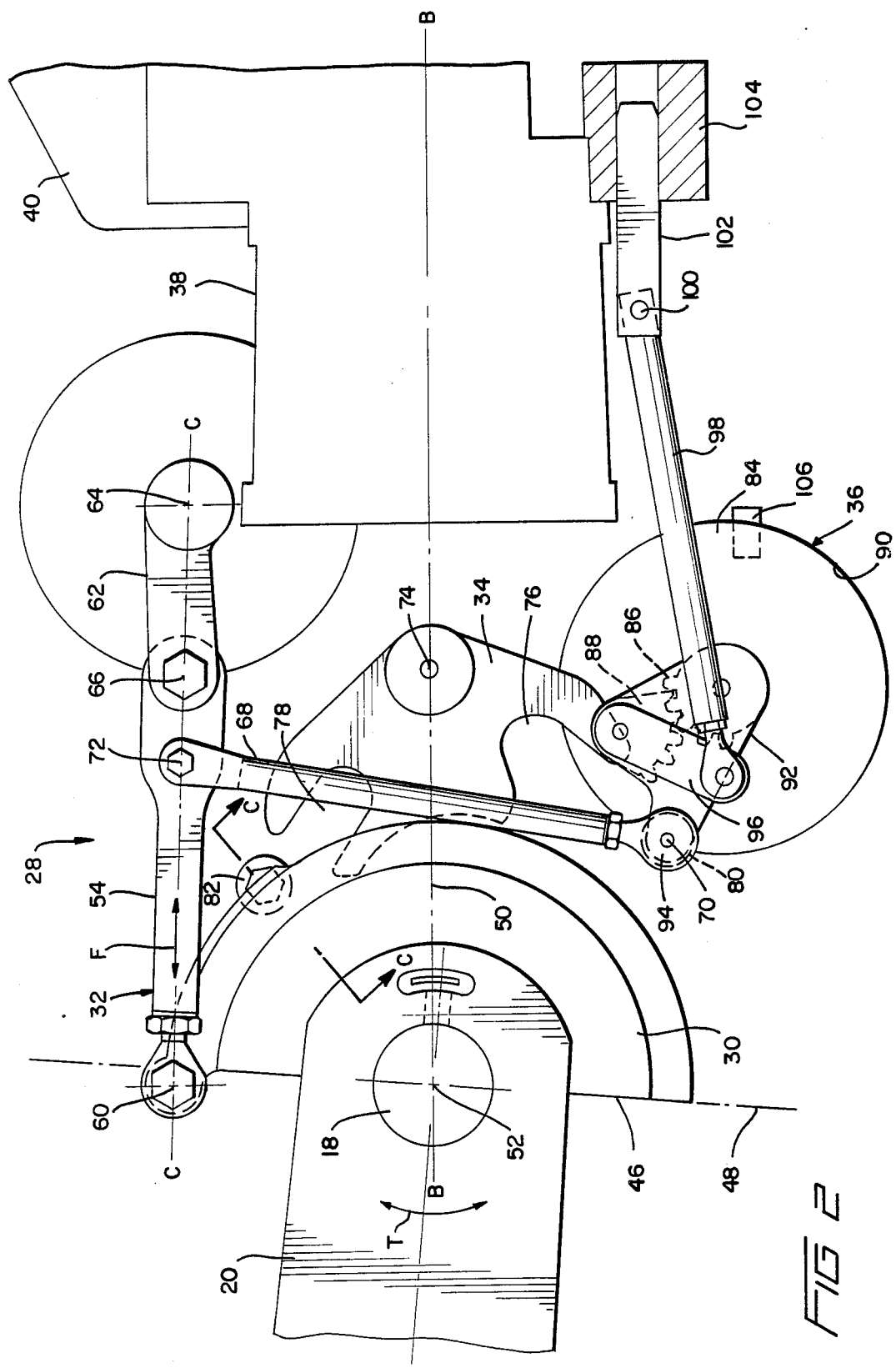
FIG. 2 is a plan view of the blade folding system according to one embodiment of the present invention.

The drag lever 62 is pinned to the pitch housing 38 at 64. The drag link 54 and the lever 62 are pinned to each other at 66. Finally a cross link or blade fold link 68 is pinned to tha actuator 36 at 70 and to the drag link 54 at 72. During flight, the lead-lag damper lnkage assemlby 32 is spread as shown in FIG. 2 so that the drag link 54 and the drag lever 62 are aligned, i.e., the pin axis of the pin 60 and the axes 64, 66 and 72 lie on axis C—C. As a result the lead-lag loading (T) is translated into axial loading (F) on the drag link 54 and the drag lever 62 and passed into the ptich housing 38 at the pin joint 64.

Figure 3:
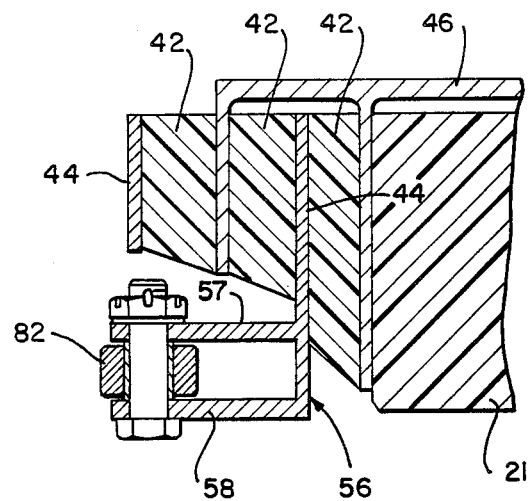
FIG. 3 is a partial section illustrating a lead-lag damper of FIG. 2 taken along the line C—C of FIG. 2.

The lead-lag damper 30 is comprised of two semicircular channels, 44 and 46 (FIG. 3), bonded together through three blocks of elastomer 42 of equal volume and stiffness. Channel 46 is attached to the rotor blade spar 21 of the rotor blade 20 and moves with the blade as it leads and lags. Channel 44 is grounded through the drag link 54 and the drag lever 62 to the pitch housing 38. For this purpose the channel 44 includes plates 57 and 58 formed integrally therewith (FIG. 3) which extend from at least the location of the pin 60 (FIG. 2). The pin 60 mounts the drag link 54 to the lead-lag damper 30. Damping is achieved through the loss factor of the elastomer in shear. The lead-lag damper 30 is preferably constructed as a semi-circular laminated structure which defines a major axis 48 and a minor axis 50, which together intersect at the vertical pin hinge axis 52 of the lead-lag hinge 18. The lead-lag damper 30 is therefore centered in its movement about the axis 52. The axis 52 and the axis of rotation of the rotor hub 40 (A—A in FIG. 1), define a plane symbolized by the axis B—B (FIG. 2).

The cam 34 is a bellcrank-like lever with two cam shaped slots, 76 and 78. The cam 34 is pivotably mounted to the pitch housing 38 at 74. The slot 76 is intended to engage and cooperate with cam roller 80 located at the pin joint 70 on the actuator 36, while the slot 78 is intended to engage and cooperate with cam roller 82 mounted to lead-lag damper 30.

The actuator 36 has been designed to preferably include a planetary system 84 comprising a sun gear 86, planet gears 88 and a ring gear 90. The sun gear 86 is driven by, for example, a motor (not shown) which can be actuated from the cockpit of the helicopter. Mounted to the housing of the planetary system 84 is a blade fold arm 92 which rotates with the housing. The blade fold arm 92 includes a lug 94 which forms part of the pin joint 70.

The actuator 36 has two output arms, namely, the blade fold arm 92, and a pitch lock arm 96. The blade fold link 68 connects the drag link 54 to the arm 92 at 70. Also pin mounted at 70 is roller 80 (same as roller 82 in FIG. 3). The pitch lock link 98 connects the pitch lock pin 102 to the arm 96. (The pitch lock pin locks the pitch housing to the hub to prevent pitch motion during the fold operation.)

As shown in FIG. 2, the lead-lag damper 30 and the cam 34 are centered (lead-lag damper 30) and pinned (cam 34) on the axis B—B, while the lead-lag damper linkage 32 and actuator 36 are situated on either side of the axis B—B. Operation When the actuator 36 (FIG. 2) is energized a detent lever 106 is released and motion is imparted to arm 96 and pitch lock link 98 which pushes pin 102 into a bore in the hub 40 adjacent to pitch housing area 104. At the end of its stroke, arm 96 trips a latch (not shown) which unlocks arm 92 and locks arm 96. Actuator 36 drives arm 92 and link 68 pushing drag link 54 and causing drag arm 62 to pivot at 64, starting the fold motion. As link 68 approaches its maximum "push" stroke, rollers 80 and 82 engage the cam 34. The rollers and can continue the fold motion during this period until arm 92 has passed center and starts to exert a pulling force on link 68. The arm 92 and link 68 complete the rotation of the blade 20 and lead-lag damper 30. The lead-lag damper link assembly 32 is positioned over center so that it cannot be back driven by any motions imparted to the folded blade, such as motions imparted by wind gusts.

To spread the rotor blade back to its operative position, it is only necessary to reverse the direction of operation.

What is claimed is:

1. In a rotor system of a helicopter including a rotor hub, at least two pitch housings mounted to the rotor hub and a rotor blade attached to each pitch housing, each rotor blade including a blade spar, the attachment of the rotor blade to the pitch housing defining a vertical pin lag hinge axis, a blade folding system, comprising:
    a lead-lag damper mounted to the rotor blade spar, centered at the vertical pin lag hinge axis and extending partly about the vertical pin lag hinge axis;
    an actuator mounted to the pitch housing;
    a lead-lag damper linkage assembly connected to the actuator, the pitch housing and the lead-lag damper;
    a pitch lock pin connected to the actuator and engageable with the rotor hub; and
    a cam pivotably mounted to the pitch housing for sequential engagement with the actuator and the lead-lag damper,
    whereby the rotor blade is folded by actuation of said actuator to engage the pitch lock pin with the rotor hub, by initiating displacement of the lead-lag damper linkage assembly in the direction of the actuator and by initiating the sequential engagement of the cam with the actuator and the lead-lag damper.

2. The blade folding system as defined in claim 1, wherein the lead-lag damper is constructed of elastomeric material and as a semi-circle defining a major axis and a minor axis which intersect at the vertical pin lag hinge axis.

3. The blade folding system as defined in claim 2, wherein the major axis of the lead-lag damper extends approximately transversely to the rotor blade.

4. The blade folding system as defined in claim 2, wherein the lead-lag damper linkage assembly is connected to said actuator, the pitch housing and the lead-lag damper such that flight loads imposed on the lead-lag damper are transferred to the pitch housing through a portion of the lead-lag damper linkage assembly.

5. The blade folding system as defined in claim 4, wherein the lead-lag damper linkage assembly includes a 3-bar linkage, two of said linkages defining a path substantially parallel to the minor axis of said lead-lag damper over which the flight loads imposed on the lead-lag damper are transferred to the pitch housing, thereby removing the third linkage of the 3-bar linkage, the actuator and the cam from the path of said flight loads.

6. The blade folding system as defined in claim 5, wherein the rotor hub defines an axis or rotation, wherein said two of said linkage of said lead-lag damper linkage assembly and said actuator are mounted to the pitch housing on either side of the plane defined by the rotor hub axis of rotation and the flap hinge axis.

7. The blade folding system as defined in claim 6, wherein the pivoted mounting of said cam defines an axis which lies in the plane defined by the rotor hub axis of rotation and the lag hinge axis.

8. The blade folding system as defined in claim 7, wherein said cam includes a pair of cam roller engaging slots assigned respectively to actuator engagement and lead-lag damper engagement.

9. The blade folding system as defined in claim 8, wherein the actuator includes a planetary gear assembly and two output arms, one from the ring gear and the other from the planet carrier being connected to the lead-lag damper linkage assembly and the other arm of said bellcrank being connected to control the displacement of the pitch lock pin.

10. The blade folding system as defined in claim 1, wherein said lead-lag damper includes a cam roller engageable by said cam to rotate said lead-lag damper and rotor blade about the lead-lag axis.

* * * * *